United States Patent [19]

Glennon et al.

[11] Patent Number: 5,068,590

[45] Date of Patent: Nov. 26, 1991

[54] BRUSHLESS GENERATOR HAVING AC EXCITATION IN GENERATING AND STARTING MODES

[75] Inventors: Timothy F. Glennon, Rockford; Byron R. Mehl, Belvidere; Pierre Thollot; Alexander Krinickas, both of Rockford, all of Ill.

[73] Assignee: Sundstrand Corporation, Rockford, Ill.

[21] Appl. No.: 453,576

[22] Filed: Dec. 20, 1989

[51] Int. Cl.[5] .......................... F02N 11/04; H02P 9/06

[52] U.S. Cl. .......................................... 322/10; 322/61; 290/38 R; 290/46

[58] Field of Search ........................ 322/10, 11, 29, 32, 322/61; 290/38 R, 46

[56] References Cited

U.S. PATENT DOCUMENTS

| | | | |
|---|---|---|---|
| 3,809,914 | 5/1974 | Kilgore et al. | 290/38 |
| 3,908,161 | 9/1975 | Messenger | 322/29 |
| 4,467,267 | 8/1984 | Hucker et al. | 322/61 |
| 4,743,777 | 5/1988 | Shilling et al. | 290/46 |
| 4,947,100 | 8/1990 | Dhyanchand et al. | 322/10 |
| 4,948,209 | 8/1990 | Baker et al. | 322/10 |
| 4,968,926 | 11/1990 | Dhyanchand | 322/10 |
| 4,992,721 | 2/1991 | Latos | 322/10 |

*Primary Examiner*—R. J. Hickey

*Attorney, Agent, or Firm*—Marshall, O'Toole, Gerstein, Murray & Bicknell

[57] ABSTRACT

An excitation system for a brushless generator having a main generator portion including a field winding disposed on a rotor and an armature winding disposed in a stator includes an exciter portion having a set of polyphase exciter field windings disposed in the stator and an armature winding disposed on the rotor and coupled to the main generator portion field winding. A first power converter is coupled to the main generator armature winding and a second power converter is coupled to the set of polyphase exciter field windings. Contactors are operable in a starting mode of operation to couple a source of electrical power to the first and second power converters and are operable in a generating mode to disconnect the source of electrical power from the first and second power converters. A control unit controls the power converters such that the power converters provide AC power to the main generator armature winding and to the set of polyphase exciter field windings during operation of the starting mode so that the rotor is accelerated. The control unit operates the power converters in the generating mode such that the second power converter provides AC power to the set of polyphase exciter field windings and the first power converter develops constant-frequency AC power.

9 Claims, 6 Drawing Sheets

FIG. 1
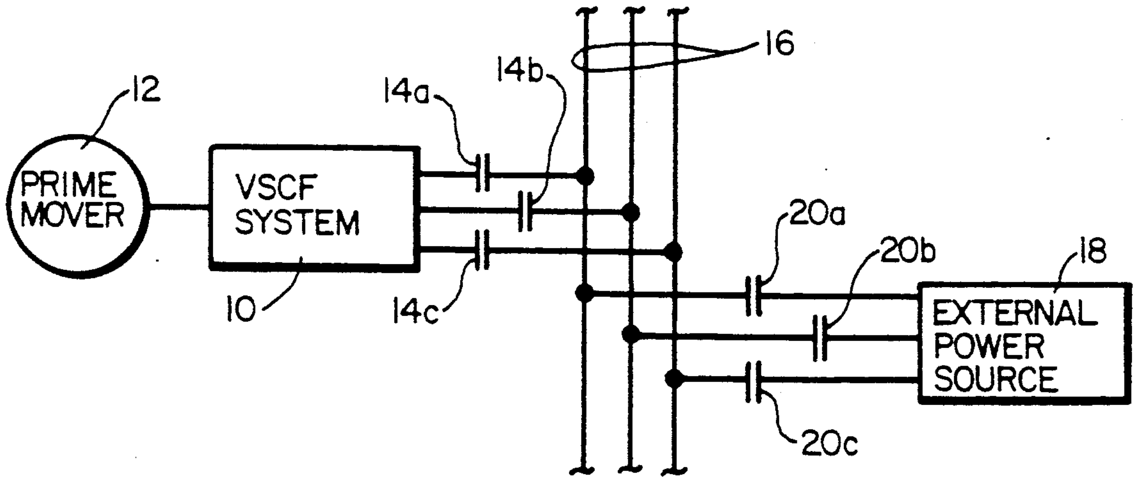
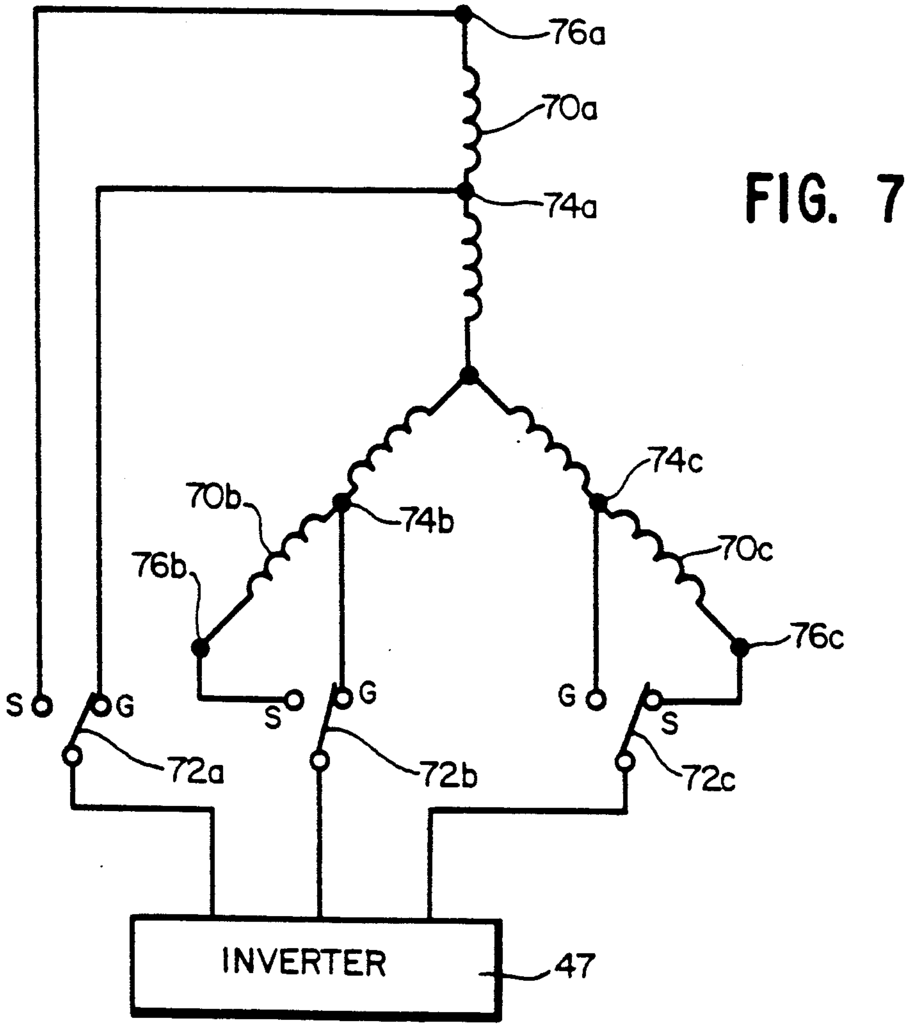
FIG. 7

BRUSHLESS GENERATOR HAVING AC EXCITATION IN GENERATING AND STARTING MODES

TECHNICAL FIELD

The present invention relates generally to brushless generators, and more particularly to brushless generators which may be used in a generating mode to convert mechanical power into electrical power or in a starting mode to convert electrical power into motive power for starting a prime mover.

BACKGROUND ART

In a variable-speed, constant-frequency (VSCF) power generating system, a brushless, synchronous generator is supplied variable-speed motive power by a prime mover and develops variable-frequency AC power at an output thereof. The variable frequency power is rectified and provided over a DC link to a controllable static inverter. The inverter is operated to produce constant frequency AC power, which is then supplied over a load bus to one or more loads.

As is known, a generator can be operated as a motor in a starting mode to convert electrical power supplied by an external AC power source into motive power which may in turn be provided to the prime mover to bring it up to self-sustaining speed. In the case of a brushless, synchronous generator having a permanent magnet generator (PMG), an exciter portion and a main generator portion mounted on a common shaft, it is necessary to provide power at a controlled voltage and frequency to the armature windings of the main generator portion and to provide field current to the main generator portion via the exciter portion so that the motive power may be developed.

Shilling, et al., U.S. Pat. No. 4,743,777 discloses a starter generator system using a brushless, synchronous generator. The system is operable in a starting mode to produce motive power from electrical power provided by an external AC power source. An exciter of the generator includes separate DC and three-phase AC field windings disposed in a stator. When operating in a starting mode at the beginning of a starting sequence, the AC power developed by the external AC power source is directly applied to the three-phase AC exciter field windings. The AC power developed by the external AC source is further provided to a variable-voltage, variable-frequency power converter which in turn provides a controlled voltage and frequency to armature windings of a main generator. The AC power provided to the AC exciter field windings is transferred by transformer action to exciter armature windings disposed on a rotor of the generator. This AC power is rectified by a rotating rectifier and provided to a main field winding of the generator. The interaction of the magnetic fields developed by the main generator field winding and armature windings in turn causes the rotor of the generator to rotate and thereby develop the desired motive power.

When the generator is operated in a generating mode, switches are operated to disconnect the AC exciter field windings from the external AC source and to provide DC power to the DC exciter field winding.

Messenger U.S. Pat. No. 3,908,161 discloses a brushless generator including three exciter field windings which are connected in a wye configuration and which are provided three-phase AC power during operation in a starting mode. The three-phase AC power induces AC power in an exciter armature winding which is rectified and applied to a main generator field winding. Main armature windings receive controlled AC power to in turn cause rotation of the generator rotor. Thereafter, the three exciter field windings are connected in series and provided DC excitation when operating in a generating mode.

Kilgore U.S. Pat. No. 3,809,914 discloses a starting system for a prime mover. An exciter of a slip ring generator driven by the prime mover is operated as a slip ring induction motor in response to the application of external AC power thereto. Specifically, the generator includes a three-phase exciter field winding which is provided AC power during starting. Also during starting, a control is connected through slip rings to a three-phase exciter armature winding which is disposed on a rotor of the generator. The current flowing in the exciter armature winding is controlled to cause the exciter to develop motive power which is transferred to the prime mover to bring it up to self-sustaining speed.

SUMMARY OF THE INVENTION

In accordance with the present invention, a brushless generator is provided with an excitation system which in turn allows prime mover starting and which does not unduly add to the size or weight of the generator.

More particularly, an excitation system for a brushless generator having a main generator portion including a field winding disposed on a rotor and an armature winding disposed in a stator includes an exciter portion having a set of polyphase exciter field windings disposed in the stator and an armature winding disposed on the rotor and coupled to the main generator portion field winding. A first power converter is coupled to the main generator armature winding while a second power converter is coupled to the set of polyphase exciter field windings. Means are operable during operation in a starting mode for coupling a source of electrical power to the first and second power converters. Such means are also operable during operation in a generating mode for coupling an armature winding of a permanent magnet generator to the second power converter and for disconnecting the source of electrical power from the first power converter. Means are coupled to the first and second power converters for controlling same such that the power converters provide AC power to the main generator armature winding and to the set of polyphase exciter field windings during operation in the starting mode so that the rotor is accelerated. The last-named means are also operable in the generating mode to control the power converters such that the second power converter provides AC power to the set of polyphase exciter field windings and the first power converter develops constant frequency AC power.

In the preferred embodiment, the AC power provided to the exciter field windings during operation in the generating mode is maintained at a low frequency, preferably on the order of three hertz.

BRIEF DESCRIPTION OF THE DRAWINGS

FIG. 1 is a block diagram of a power generating system;

FIG. 7 is a schematic diagram illustrating an alternative configuration of the exciter field windings to implement a further embodiment of the invention.

DESCRIPTION OF THE PREFERRED EMBODIMENT

Referring now to FIG. 1, a variable speed, constant frequency (VSCF) system 10 operates in a generating mode to convert variable speed motive power produced by a prime mover 12, such as an aircraft jet engine, into constant-frequency AC electrical power which is delivered through controllable contactors 14*a*,14*b*,14*c* to a load bus 16. The VSCF system 10 is also operable in a starting mode using electrical power provided by an external power source 18, such as a ground power cart, which is in turn coupled to the system 10 through controllable contactors 20*a*–20*c* and the load bus 16. Alternatively, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Figure 2:
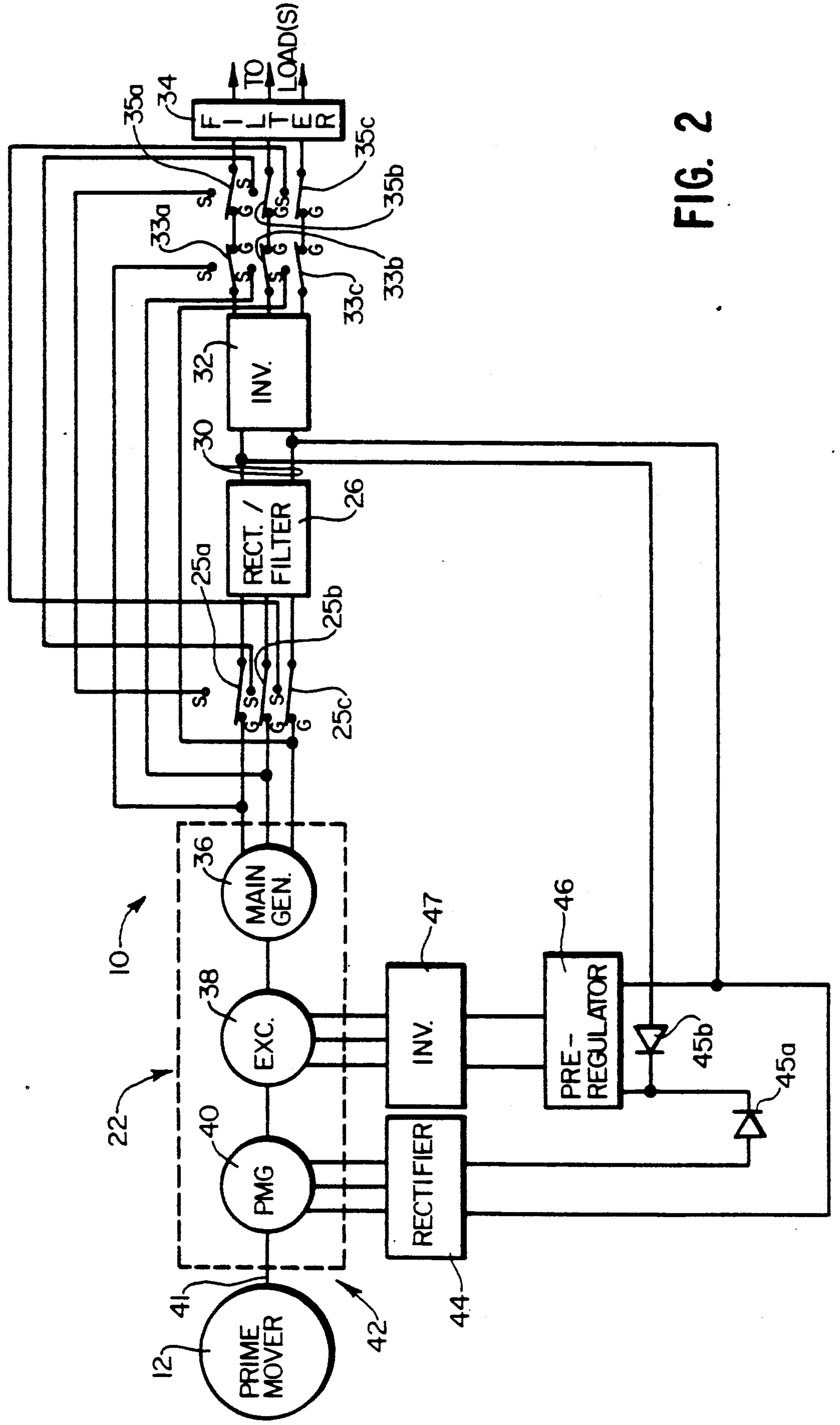
FIG. 2 comprises a combined, simplified mechanical and electrical block diagram of the power generating system shown in FIG. 1.

Referring now to FIG. 2, the VSCF system 10 includes a brushless, synchronous generator 22 driven by the prime mover 12. During operation in the generating mode, the generator 22 develops polyphase, variable-frequency AC power which is provided by a set of contactors represented by switches 25*a*–25*c* to a rectifier/filter 26. The rectifier/filter 26 converts the AC power into DC power which is provided over a DC link 30 to a polyphase inverter 32 that converts the DC power into three-phase, constant-frequency AC power. This AC power is provided to filter 34 by sets of contactors represented by switches 33*a*–33*c* and 35*a*–35*c* and is provided via the set of controllable contactors 14*a*–14*c* to the load bus 16.

Figure 3:
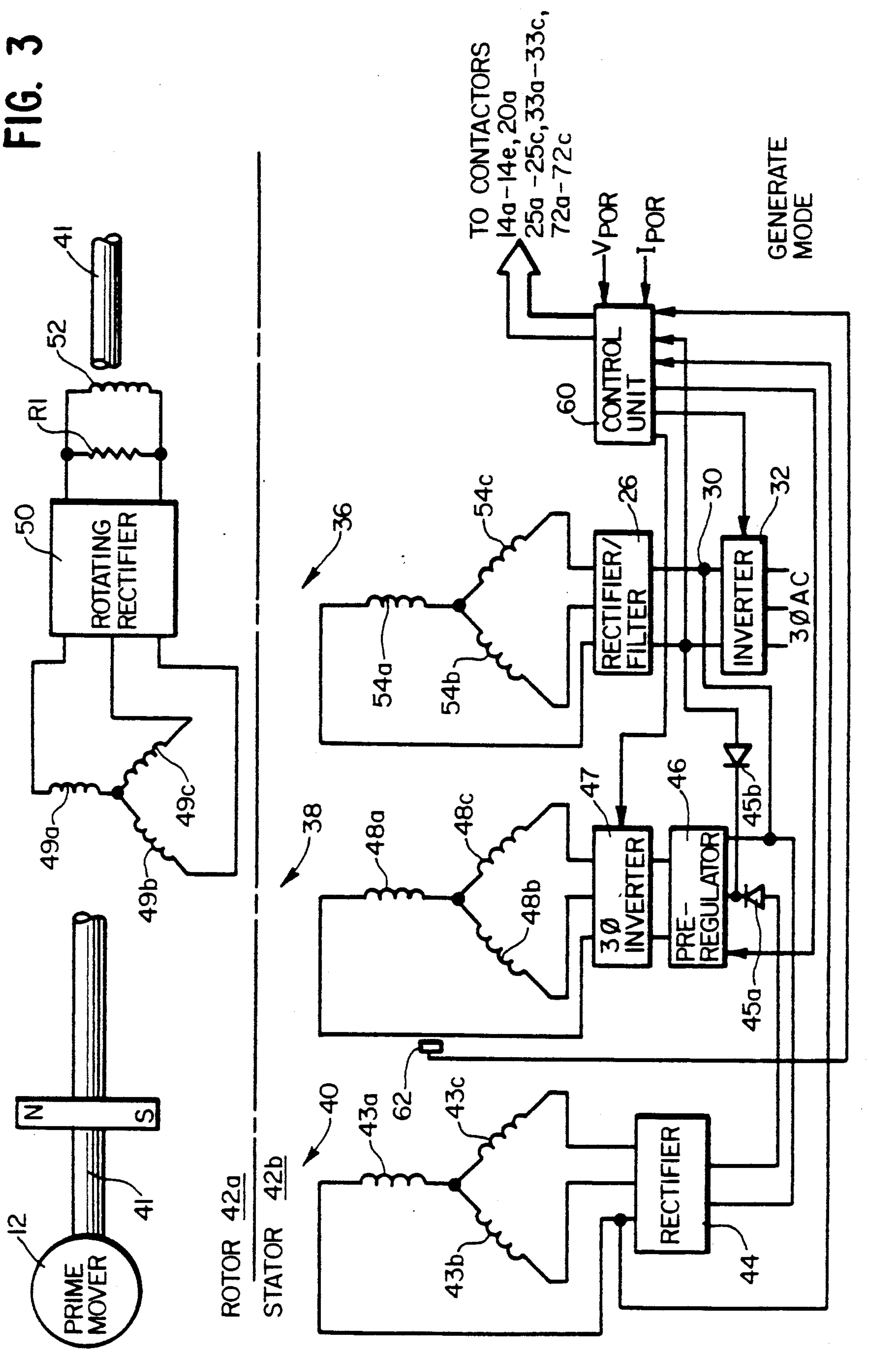
FIG. 3 comprises a combined, simplified mechanical and electrical block diagram of the brushless generator and power converters of FIG. 2 during operation in the generating mode.

Referring also to FIG. 3 which shows the system 10 of FIG. 2 in greater detail during operation in the generating mode except that the contactors represented by the switches 25*a*–25*c*, 33*a*–33*c* and 35*a*–35*c* are omitted, the generator 22 includes a main generator portion 36, an exciter portion 38 and a permanent magnet generator (PMG) 40, all of which include rotor structures mounted on a common shaft 41 of a rotor 42*a* and stator structures disposed in a stator 42*b*. In the generating mode of operation, rotation of the common shaft 41 causes polyphase power to be developed in armature windings 43*a*–43*c* of the PMG 40 which is in turn rectified by a rectifier 44 and delivered through a diode 45*a* to a preregulator 46. The preregulator 46 steps down the voltage developed by the rectifier 44 and delivers the stepped-down DC voltage to a three-phase inverter 47 coupled to polyphase field windings 48*a*–48*c* of the exciter 38. The three-phase inverter 47 converts the DC voltage from the preregulator 46 into low-frequency AC power at a controlled current level and provides such current to the field windings 48*a*–48*c*. This current induces an AC voltage in armature windings 49*a*–49*c* of the exciter 38 which is rectified by a rotating rectifier assembly 50. The resulting DC power is supplied to a field winding 52 of the main generator 36 having a resistor R1 connected thereacross. Rotation of the common shaft 41 while the field current is flowing in the field winding 52 in turn causes polyphase power to be developed in armature windings 54*a*–54*c* of the main generator portion 36. As noted previously, the polyphase power is converted into DC power by the rectifier/filter 26 and reconverted into constant frequency AC power by the inverter 32.

In the preferred embodiment, the frequency of the power developed by the inverter 47 during operation in the generating mode is on the order of three hertz.

During operation in the starting mode, the contactors of FIG. 2 are operated such that the switches 25*a*–25*c*, 33*a*–33*c* and 35*a*–35*c* are moved to the positions opposite those shown in FIG. 2. Thus, the external AC power source 18 and the filter 34 are coupled to the input of the rectifier/filter 26 and the output of the inverter 32 is coupled to the armature windings 54*a*–54*c* of the main generator 36 so that the system 10 is thus connected in the configuration of FIG. 5. Again, the contactors of FIGS. 1 and 2 are not shown in FIG. 5 for the sake of simplicity. During operation in this mode, the preregulator 46 receives DC power from the DC link via a diode 45*b*. The preregulator 46, however, does not step down the DC voltage provided by the rectifier/filter 26; rather, such power is provided in unmodified form to the inverter 47. The inverters 32, 47 are operated in this mode to apply AC power to the windings 48*a*–48*c* and 54*a*–54*c*. The AC power provided to the windings 48*a*–48*c* causes AC power to be induced in the exciter armature windings 49*a*–49*c* by transformer action. Such power is rectified by the rotating rectifier assembly 50 and is applied as DC power to the main generator field winding 52. The interaction of the magnetic fields established by the currents flowing in the windings 52 and 54*a*–54*c* causes the rotor structures, and hence the common shaft 41, to accelerate, in turn accelerating the prime mover 12.

Once a particular speed of the shaft 41 is reached, the inverter 47 is operated to provide the low-frequency AC current to the exciter field windings 47*a*–47*c*. The generating system 10 may thereafter be operated in the generating mode once the prime mover 12 reaches operating speed.

Figure 5:
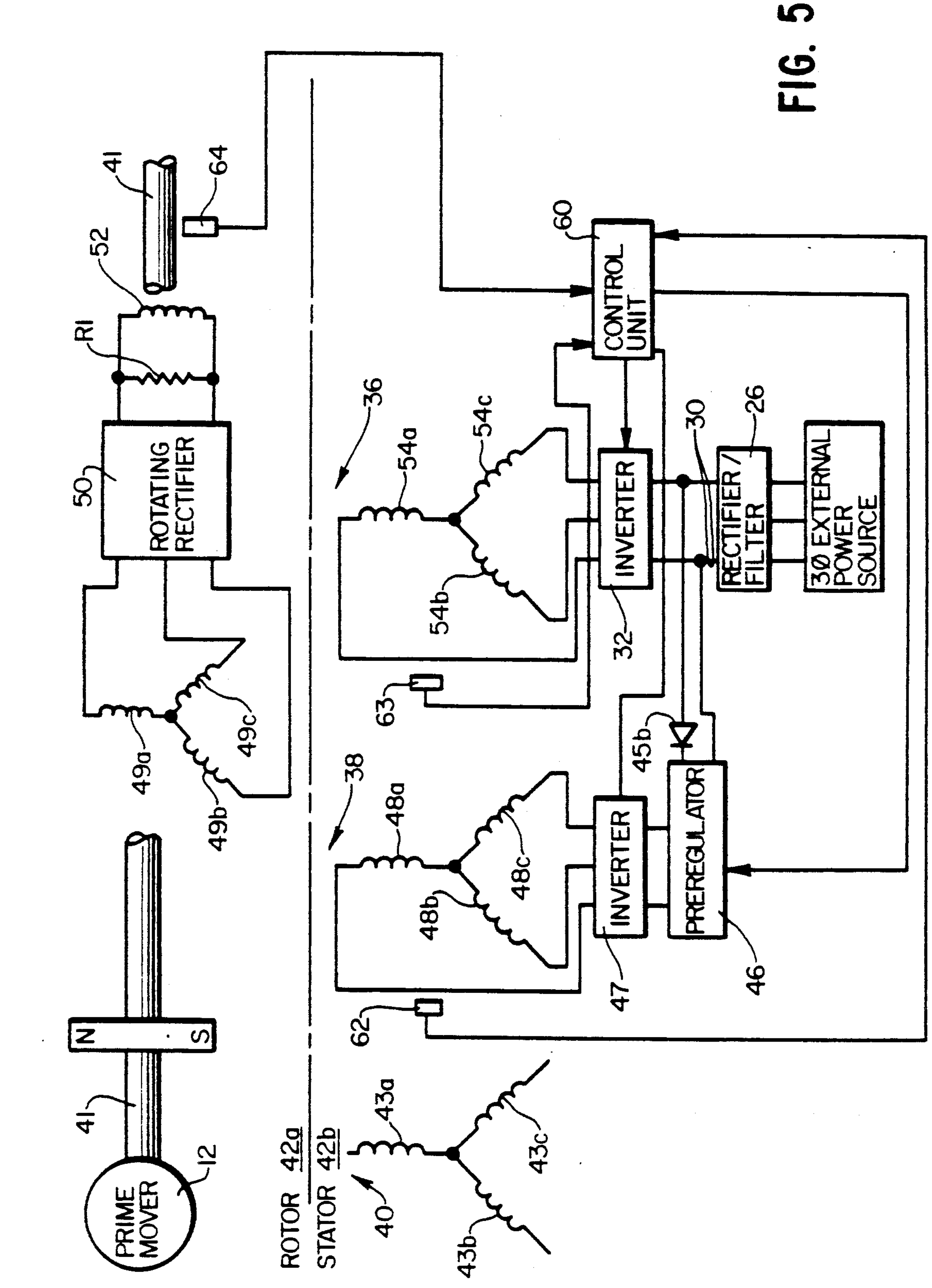
FIG. 5 is a diagram similar to FIG. 3 of the brushless generator and power converters of FIG. 2 during operation in the starting mode.

The inverters 32 and 47 include switches connected in a conventional bridge configuration which are operated by a control unit 60. The control unit 60 also controls the contactors 14*a*–14*c* and 20*a*–20*c* and the contactors represented by the switches 25*a*–25*c*, 33*a*–33*c* and 35*a*–35*c*. As seen in FIGS. 3 and 5, the control unit 60 is responsive to various parameters. During operation in the generating mode, the control unit 60 is responsive to the voltage and current at a point of regulation (POR) at or near the load bus 16, as well as the current flowing in a particular exciter field winding, such as the phase A winding 48*a* of the exciter 38, as detected by a current sensor 62 which may be, for example, a hall-effect or optical device. The control unit 60 is further responsive to the voltage on the DC link 30 as well as the voltage developed in one of the windings of the PMG 40, for example the winding 43*a*.

During operation in the starting mode, the control unit 60 is responsive to the current in the winding 48*a* as sensed by the current sensor 62, the current in the winding 54*a* as detected by a current sensor 63 which may be identical to the current sensor 62 and the speed of the shaft 41, as detected by a speed sensor 64. In the preferred embodiment, the speed sensor 64 comprises a resolver which develops position information that is used by the control unit 60 to detect the speed of the shaft 41.

The control unit 60 further controls the preregulator 46 which, in the preferred embodiment, comprises a controllable DC buck regulator. If desired, the preregulator 46 may instead comprise a phase controlled rectifier circuit or a different type of DC regulator.

Alternatively, the preregulator 46 may be replaced by a step-down transformer which is bypassed in the starting mode so that the inverter 47 is connected directly to the DC link 30. Still further, as seen in FIG. 7, the preregulator 46 or the step-down transformer may be dispensed with entirely, in which case the windings 48*a*–48*c* may be replaced by tapped windings 70*a*–70*c* and contactors represented by switches 72*a*–72*c* which are operated by the control unit 60. The windings 70*a*–70*c* include mid-taps 74*a*–74*c* which are coupled to the output of the inverter 47 during operation in the generating mode. During operation in the starting mode, the inverter 47 is coupled to end taps 76*a*–76*c*.

In each embodiment, a reduced voltage is provided to the exciter 38 during operation in the generating mode as compared with operation in the starting mode to prevent over-excitation of the main generator portion field winding 52. In should be noted that when the controllable preregulator 46 is used, voltage reduction in the generating mode may be accomplished by controlling either or both of the preregulator 46 and the inverter 47 to provide the reduced voltage.

Figure 4:
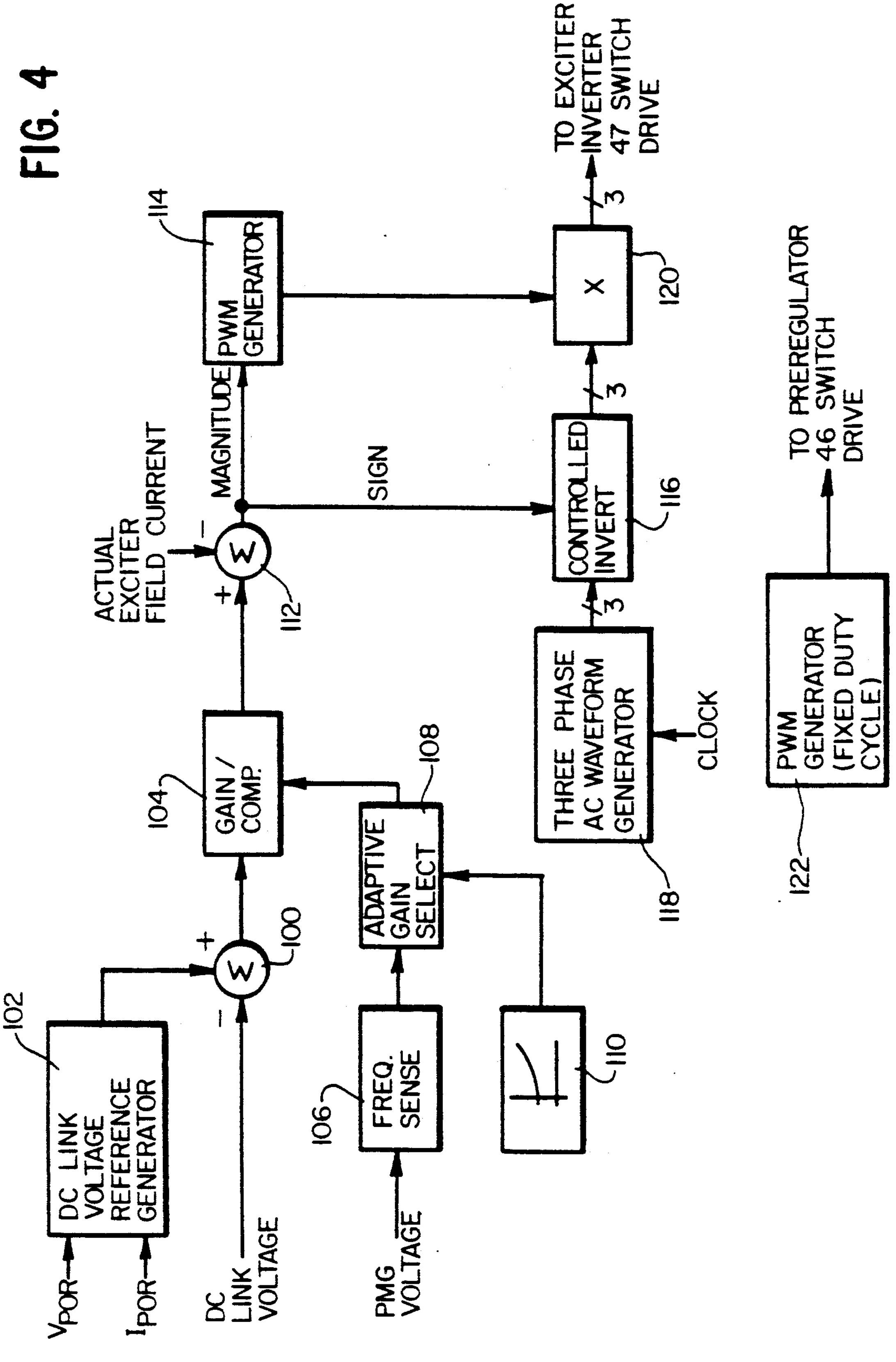
FIG. 4 comprises a block diagram illustrating the operation of the control unit in the generating mode.

FIG. 4 comprises a block diagram illustrating the operation of the control unit 60 while in the generating mode. In the preferred embodiment, the control unit 60 comprises a processor which executes programming to in turn control the inverters 32, 47, the preregulator 46 (if used) and the contactors 14*a*–14*c*, 20*a*–20*c* and the contactors represented by the switches 25*a*–25*c*, 33*a*–33*c*, 35*a*–35*c* and 72*a*–72*c*. The programming for controlling the inverters 32, 47 and the preregulator 46 is represented by the circuits of FIG. 4. If desired, the control unit 60 may alternatively be implemented by analog or discrete digital circuits. Also, it should be noted that the programming for controlling the contactors is not shown for simplicity, inasmuch as such programming is readily apparent to one skilled in the art.

The voltage on the DC link 30 is sensed and provided to an inverting input of a summer 100 having a noninverting input which receives a reference signal developed by a reference signal generator 102. The reference signal generator 102 develops a signal representing a desired DC link voltage based upon the voltage and current $V_{POR}$, $I_{POR}$ at the point of regulation. The output of the summer 100 is an error signal which is modified by an adaptive gain and compensation circuit 104. The gain of the circuit 104 is dependent upon the speed of the shaft 41, as detected by a frequency sensing circuit 106 which receives the output of the PMG 40 and an adaptive gain selection circuit 108 which adjusts the gain of the circuit 104 in accordance with a schedule established by a function generator 110. These circuits cause the system gain over the speed range of the generator to be substantially constant.

The modified error signal from the gain and compensation circuit 104 represents the desired exciter field current magnitude and is provided to a noninverting input of a further summer 112. The summer 112 receives at an inverting input thereof a signal representing the actual exciter field current as detected by the current transformer 62. The summer 42 develops an error signal representing the direction and magnitude of deviation of the actual exciter field current magnitude from the desired magnitude. The portion of the error signal representing the magnitude of the deviation is provided to a pulse width modulation (PWM) generator 114 which develops a pulse width modulated switch control waveform having a duty cycle which is dependent upon the magnitude of error signal from the summer 112. The portion of the signal from the summer 112 representing the direction of deviation of the actual exciter field current from the desired magnitude is provided to a controlled inverting circuit 116 which receives timing signals from a three-phase AC waveform generator 118. The waveform generator 118, which is responsive to a clock signal establishing the desired fundamental frequency of the inverter 47, and the controlled inverting circuit 116 develop the required three-phase timing waveforms for control of the inverter 47. These timing waveforms are multiplied by a multiplier 120 with the PWM waveform developed by the generator 114 to derive switch control signals for the switches in the inverter 47. These signals are provided to switch drive circuitry in the inverter 47 which provides isolation and amplification as needed to operate the inverter switches.

In the event that the preregulator 46 is of the controllable buck regulator type, a PWM generator 122 operating at a fixed duty cycle develops switch control signals which are provided to a switch drive in the preregulator 46. The fixed duty cycle is selected to provide the proper step down ratio described previously.

If the preregulator is replaced by a step down transformer, the circuit 122 is not necessary, as should be obvious to one skilled in the art.

Figure 6:
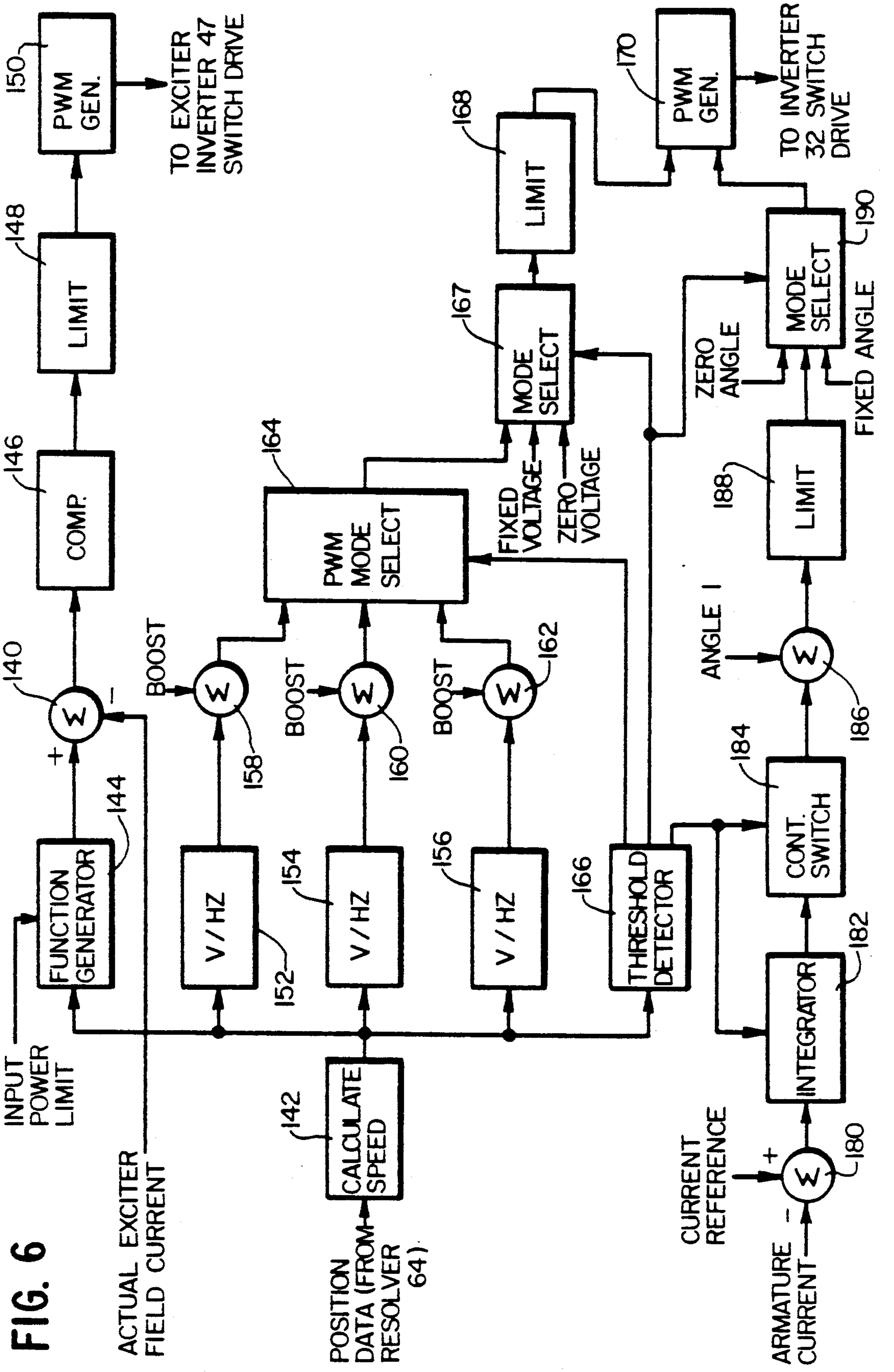
FIG. 6 comprises a block diagram illustrating the operation of the control unit in the starting mode.

FIG. 6 illustrates programming executed by the control unit 60 to control the inverters 32 and 47 during operation in the start mode. As previously mentioned, in the event the preregulator 46 is used, the control unit 60 operates the preregulator 46 to deliver the voltage on the DC link 30 in unmodified form to the inverter 47. Inasmuch as this control function is straightforward, the programming for effecting same is not shown in FIG. 6.

The actual exciter field current is detected by the current sensor 62 and is delivered to an inverting input of a summer 140. The position data developed by the resolver 64 are converted into data representing the speed of the shaft 41 by a circuit 142 and are provided to a function generator 144 which may be implemented by a set of look up tables. The function generator 144 receives an input power limit command and develops a signal representing the desired exciter field current as a function of speed. This signal is provided to a noninverting input of the summer 140. The function generator 144 acts to limit the power drawn by the generator 22 in the starting mode so that external power sources of different power ratings may be used to start the prime mover 12.

The output of the summer 140 is a signal representing the deviation of the desired exciter field current from a desired current magnitude and such signal is processed by compensation and limiting circuits 146, 148 and delivered to a PWM generator 150. The PWM generator develops a control waveform for switches in the inverter 47 to cause same to be operated such that the deviation between the desired and actual currents approaches zero. The output from the PWM generator 150 is provided to the switch drive circuits of the inverter 47 described previously.

By controlling exciter current in this fashion, the generator 22 back EMF is controlled. The back EMF is reduced at higher speeds so that the power drawn by the machine is held at a fixed limit even though a constant current is provided to the main armature as described hereinafter.

The data developed by the circuit 142 representing the speed of the shaft 41 is further provided to first through third volts-per-hertz ratio determining circuits 152, 154 and 156, each of which develops a signal representing the desired volts-per-hertz ratio of the power to be applied to the armature windings 54a–54c of the main generator portion 36 during operation in the starting mode. The ratios determined by the blocks 152, 154 and 156 are different and the signals developed by these circuits are augmented by a boost value to compensate for $I^2R$ drops in the windings 54a–54c. The three resulting signals are provided to a PWM mode selection circuit 164 which is controlled by a first control signal from a threshold detector 166 that is responsive to the speed data from the circuit 142. The mode selection circuit 164 passes one of the three signals provided to its inputs depending upon the speed of the generator to a first input of a further mode selection circuit 167 having additional inputs which receive signals representing a fixed voltage and a zero voltage to be produced by the inverter 32. The mode selection circuit 167 is responsive to a second control signal developed by the threshold detector 166. The mode selection circuit 167 passes one of the three signals to a limiting circuit 168 and a PWM generator 170. In operation, the circuits 152–170 implement five modes of operation in dependence upon the speed of the shaft 41. Specifically, the inverter develops a zero voltage, a non-zero fixed voltage or one of three voltages having a modulation frequency proportional to the fundamental output frequency of the inverter 32. As the speed of the shaft 41 increases, the duty cycle and frequency of the output of the inverter 32 are increased until maximum voltage at 100% duty cycle is reached.

A signal representing the armature current magnitude developed by the current sensor 63 is supplied to an inverting input of a summer 180 having a non-inverting input which receives a reference signal representing the desired armature current. The resulting error signal developed by the summer 180 is integrated by an integrator 182 which is reset by a reset signal developed by a threshold detector 166. The reset signal is generated at a predetermined rotational speed of the shaft 41, such as. 1000 rpm. The output of the integrator 182 represents a particular commutation angle for the inverter 32, i.e., the signal represents an angular displacement between the output voltage of the inverter 32 and the back EMF of the generator 22. This signal is supplied to a switch 184 controlled by the reset signal. At speeds above 1000 rpm, the signal from the integrator 182 is provided to a further summer 186 which sums therewith a signal ANGLE1 representing an offset commutation angle. The resulting signal is limited and provided to one input of a further mode select circuit 190. The mode select circuit 190 includes further inputs which receive signals representing a zero commutation angle and a fixed commutation angle. The mode select circuit 190 is controlled by the second control signal developed by the threshold detector 166 such that one of the three signals representing zero angle, the fixed angle or the output of the limiter 188 is provided as a commutation angle command to the PWM generator 170.

It should be noted that other control schemes for the inverters 32 and 47 may be substituted for those shown in FIGS. 4 and 6, if desired.

We claim:

1. An excitation system for a brushless generator having a main generator portion including a field winding disposed on a rotor and which receives field current and an armature winding disposed in a stator wherein the rotor is movable with respect to the stator and a permanent magnet generator (PMG) having an armature winding in which control power is developed wherein the generator is operable in a generating mode to convert motive power into electrical power and in a starting mode to convert electrical power provided to the main generator armature winding into motive power, comprising:

an exciter portion having a set of polyphase exciter field windings disposed in the stator and an armature winding disposed on the rotor and coupled to the main generator portion field winding;

a source of electrical power;

a first power converter coupled to the main generator armature winding;

a second power converter coupled between the PMG armature winding and the set of polyphase exciter field windings;

means operable in the starting mode for coupling the source of electrical power to the first and second power converters and operable in the generating mode for disconnecting the source of electrical power from the first and second power converters; and means coupled to the first and second power converters for controlling same such that the power converters provide AC power to the main generator armature winding and to the set of polyphase exciter field windings during operation in the starting mode so that the rotor is accelerated and such that the second power converter develops AC power from the control power and provides same to the set of polyphase exciter field windings and the first power converter develops constant frequency AC power during operation in the generating mode.

2. The excitation system of claim 1, further including means for causing the second power converter to develop a first output voltage magnitude during operation in the starting mode and a second output voltage magnitude less than the first output voltage magnitude during operation in the generating mode.

3. The excitation system of claim 2, wherein the causing means comprises a preregulator coupled to the second power converter.

4. The excitation system of claim 3, wherein the second power converter comprises an inverter operated in a pulse width modulated mode at a controlled duty cycle and the preregulator comprises a DC buck regulator which has a fixed step down ratio.

5. The excitation system of claim 3, wherein the second power converter comprises an inverter operated in a pulse width modulated mode at a fixed duty cycle and the preregulator comprises a DC buck regulator which is controlled to regulate the inverter output voltage.

6. The excitation system of claim 2, wherein the second power converter comprises an inverter operated in a pulse width modulated mode at a controlled duty cycle and wherein the causing means comprises a step down transformer coupled to the second power converter in the generating mode.

7. The excitation system of claim 2, wherein the second power converter comprises an inverter operated in a pulse width modulated mode at a fixed duty cycle and the preregulator comprises a phase-controlled rectifier.

8. A brushless generator operable in a generating mode to convert motive power into electrical power, comprising:

a rotor;

a main field winding on the rotor;

an exciter armature winding on the rotor, the exciter armature winding being electrically coupled to the main field winding;

a stator;

a main armature winding in the stator, the main armature winding being magnetically coupled to the main field winding on the rotor;

a set of exciter field windings magnetically coupled to the exciter armature winding; and means for providing relatively low-frequency AC power to said exciter field windings when the generator is operating in the generating mode, said relatively low frequency being on the order of three Hz.

9. The brushless generator of claim 8, wherein the means for providing relatively low frequency AC power comprises a three-phase inverter.

* * * * *